(12) United States Patent
Bodkin et al.

(10) Patent No.: US 8,233,148 B2
(45) Date of Patent: Jul. 31, 2012

(54) HYPERSPECTRAL IMAGING SYSTEMS

(75) Inventors: Andrew Bodkin, Wellesley, MA (US);
Andrew I. Sheinis, Madison, WI (US);
Adam Norton, Palo Alto, CA (US)

(73) Assignee: Bodkin Design & Engineering LLC, Newton, MA (US)

( * ) Notice: Subject to any disclaimer, the term of this patent is extended or adjusted under 35 U.S.C. 154(b) by 981 days.

(21) Appl. No.: 11/758,986

(22) Filed: Jun. 6, 2007

(65) Prior Publication Data

US 2008/0088840 A1 Apr. 17, 2008

Related U.S. Application Data

(60) Continuation of application No. 11/220,016, filed on Sep. 6, 2005, now abandoned, which is a continuation-in-part of application No. 11/437,085, filed on May 19, 2006, now abandoned, which is a division of application No. 10/325,129, filed on Dec. 20, 2002, now Pat. No. 7,049,597.

(60) Provisional application No. 60/607,327, filed on Sep. 3, 2004, provisional application No. 60/344,130, filed on Dec. 21, 2001.

(51) Int. Cl.
*G01J 3/28* (2006.01)
(52) U.S. Cl. ........................................ 356/328
(58) Field of Classification Search .............. 356/328
See application file for complete search history.

(56) References Cited

U.S. PATENT DOCUMENTS

| | | |
|---|---|---|
| 3,698,812 A | 10/1972 | Nelson |
| 4,175,844 A | 11/1979 | Glaser-Inbari |
| 4,193,691 A | 3/1980 | Fjarlie |
| 4,561,775 A | 12/1985 | Patrick et al. |
| 4,708,420 A | 11/1987 | Liddiard |
| 4,754,139 A | 6/1988 | Ennulat et al. |
| 5,136,312 A | 8/1992 | Weaver et al. |
| 5,168,528 A | 12/1992 | Field, Jr. |
| 5,191,469 A | 3/1993 | Margolis |
| 5,239,179 A | 8/1993 | Baker |
| 5,583,340 A | 12/1996 | Grossman |
| 5,760,398 A | 6/1998 | Blackwell et al. |
| 5,763,882 A | 6/1998 | Klapper et al. |
| 5,825,029 A | 10/1998 | Agnese et al. |
| 5,841,574 A | 11/1998 | Willey |
| 5,877,500 A | 3/1999 | Braig et al. |
| 5,963,749 A | 10/1999 | Nicholson |
| 6,122,051 A * | 9/2000 | Ansley et al. ............ 356/326 |
| 6,178,346 B1 | 1/2001 | Amundson et al. |
| 6,362,872 B1 | 3/2002 | Berdanier |
| 6,444,984 B1 | 9/2002 | Lundgren et al. |

(Continued)

OTHER PUBLICATIONS

Restriction Requirement, Related U.S. Appl. No. 10/325,129; Feb. 11, 2005.

(Continued)

*Primary Examiner* — Tarifur Chowdhury
*Assistant Examiner* — Abdullahi Nur
(74) *Attorney, Agent, or Firm* — Lathrop & Gage LLP (57) ABSTRACT

Hyperspectral imaging systems that may be used for imaging objects in three-dimensions with no moving parts are disclosed. A lenslet array and/or a pinhole array may be used to reimage and divide the field of view into multiple channels. The multiple channels are dispersed into multiple spectral signatures and observed on a two-dimensional focal plane array in real time. The entire hyperspectral datacube is collected simultaneously.

25 Claims, 13 Drawing Sheets

U.S. PATENT DOCUMENTS

| | | | |
|---|---|---|---|
| 6,549,828 | B1 | 4/2003 | Garrot et al. |
| 6,552,321 | B1* | 4/2003 | Mills .................... 250/208.1 |
| 6,665,116 | B1 | 12/2003 | Harvey et al. |
| 6,756,594 | B2 | 6/2004 | George et al. |
| 6,781,127 | B1 | 8/2004 | Wolff et al. |
| 6,795,241 | B1* | 9/2004 | Holzbach .................. 359/463 |
| 7,227,116 | B2* | 6/2007 | Gleckler ................ 250/208.1 |
| 7,242,478 | B1 | 7/2007 | Dombrowski et al. |
| 7,456,957 | B2 | 11/2008 | Everett et al. |
| 2001/0045516 | A1 | 11/2001 | Emanuel et al. |
| 2002/0047896 | A1 | 4/2002 | Basiji et al. |
| 2002/0135763 | A1 | 9/2002 | MacKinnon et al. |
| 2002/0180866 | A1 | 12/2002 | Monroe |
| 2003/0161533 | A1* | 8/2003 | Sunshine et al. ............ 382/191 |
| 2003/0174238 | A1 | 9/2003 | Wu |
| 2003/0202177 | A1 | 10/2003 | Reznichenko et al. |
| 2004/0090623 | A1 | 5/2004 | Richman |
| 2004/0119020 | A1 | 6/2004 | Bodkin |
| 2004/0238724 | A1 | 12/2004 | Moody et al. |
| 2004/0252992 | A1 | 12/2004 | Hunter |
| 2005/0023445 | A1 | 2/2005 | Horn et al. |
| 2005/0041144 | A1 | 2/2005 | Mitchell et al. |

OTHER PUBLICATIONS

Response to Restriction Requirement, Related U.S. Appl. No. 10/325,129; filed Mar. 14, 2005.

Office Action, Related U.S. Appl. No. 10/325,129; Jun. 14, 2005.

Response to Office Action, Related U.S. Appl. No. 10/325,129; filed Oct. 14, 2005.

Notice of Allowance, Related U.S. Appl. No. 10/325,129; Dec. 29, 2005.

Office Action, Related U.S. Appl. No. 11/220,016; Apr. 11, 2007.

Office Action, Related U.S. Appl. No. 11/437,085; Aug. 11, 2006.

Response to Office Action, Related U.S. Appl. No. 11/437,085; filed Nov. 13, 2006.

Office Action, Related U.S. Appl. No. 11/437,085; Feb. 7, 2007.

Response to Office Action, Related U.S. Appl. No. 11/437,085; filed Aug. 7, 2007.

Notice of Allowance, Related U.S. Appl. No. 11/437,085; Oct. 1, 2007.

Martini et al., "Geological and geo-botanical characterization of a hydrothermal system using hyperspectral imagery analysis", 1 Proc. of the Thirteenth International Conference, Applied Geologic Remote Sensing, 337-341 (1999).

Bach, H. et al. "Atmospheric Correction of Hyperspectral Data in Terms of the Determination of Plant Parameters", 2318 Proc. of SPIE, 52-62 (1994).

Sheinis, A.J. et al., "Performance Characteristics of the new Keck Observatory echelle spectrograph and imager", 4008 Proc. SPIE, 522-533 (2000).

Bacon et al. "The Integral Field Spectrograph TIGER", 1988 vltt. Conf. 1185B, pp. 1185-1194.

Sheinis, A.I., et al., "Integral Field Unit for the Echellete Spectrograph and Imager at Keck II", 4841 Proc. of SPIE, 1078-85 (2003).

Bacon, R. et al.. "3D Spectrography at High Spatial Resolution", 113 Astron. Astrophys. Suppl. Ser. 347-57 (1995).

Goetz, A.F.H. et al., Imaging Spectrometry for Earth Remote Sensing, Science, New Series, vol. 228, No. 4704 (Jun. 7, 1985), pp. 1147-1153.

Content, R., "New Design for Integral Field Spectroscopy with 8-m Telescopes", 2871 Proc. of SPIE 1295-1305 (1997).

Sheinis, A.I.. et al., "ESI, a new Keck Observatory echellette spectrograph and imager", 114 Pub. of Astronomical Society of the Pacific, 851-865 (2002).

Kailey. W.F., et al., "Use of Hyperspectral Imagery for Broad-Area Detection of Small Targets", 2819 Proc, of SPIE, 15-23 (1996).

Willoughby. C.T. et al., "Application of Hyperspectral Imaging Spectrometer Systems to Industrial Inspection", 2599 Proc. of SPIE, 264-272 (1996).

Eismann, M.T. et al, "Target Detection in Desert Backgrounds", 2561 Proc. of SPIE, 80-97 (1995).

Murguia, J.E. et al., "A Compact Visible/Near-infrared Hyperspectral Imager", 4028 Proc SPIE 457-468 (2000).

Ewing, B., et al., "Spectrometer Performance Comparison for the Characterization of Transient Events", obtained from link on internet archive dated Oct. 18, 2003, 8 pages.

Opto-Knowledge Systems, Inc. (2003) Website, http://www.techexpo.com/WWW/opto-knowledge/projmwlw4d-is.html; obtained from internet archive dated Aug. 5, 2004, 2 pages.

Vanderriest, C. et al., "Astronomical uses of integral field spectrography: present applications at CFHT and future developments", 2198 SPIE 1376-1384 (1994).

Xing, Y. et al., "Hyperspectral Image Analysis using ENVI", 4383 Proc SPIE 79-86 (2001).

Fransden. S. et al. "An Astronomical Seismometer", 279 Astron. Astrophys. 310-321 (1993).

Esplin, R. et al., "SABER Instrument Design Update", 2553 Proc. of SPIE, 253-63 (1995).

Cayla, F. et al., "IASA Instrument Overview", 2553 Proc. of SPIE, 316-328 (1995).

U.S. Appl. No. 11/933,253, Office Action mailed Dec. 27, 2010, 12 pages.

\* cited by examiner

HYPERSPECTRAL IMAGING SYSTEMS

RELATED APPLICATIONS

This application is a continuation of U.S. Ser. No. 11/220,016, filed Sep. 6, 2005, now abandoned which claims priority to U.S. Provisional Ser. No. 60/607,327, filed Sep. 3, 2004. This application is also a continuation-in-part of U.S. Ser. No. 11/437,085, filed May 19, 2006, now abandoned which is a divisional of U.S. Ser. No. 10/325,129, filed Dec. 20, 2002 (now U.S. Pat. No. 7,049,597), which claims priority to U.S. Patent Application 60/344,130, filed Dec. 21, 2001. The aforementioned patent and patent applications are each incorporated herein by reference.

U.S. GOVERNMENT RIGHTS

The U.S. Government has certain rights in this invention as provided for by the terms of Grant #F19628-03-C-0079 awarded by the U.S. Air Force.

BACKGROUND

Hyperspectral imaging is a technique used for surveillance and reconnaissance in military, geophysical and marine science applications. Objects viewed by a hyperspectral imaging system are often displayed in three-dimensions, x, y (spatial) and λ (color wavelength). Spatial observations (x, y) allow a person to observe an image when high contrast is available. However, during conditions of low contrast, such as fog, smoke, camouflage, and/or darkness, or when an object is too far away to resolve, spectral signatures help identify otherwise unobservable objects, for example to differentiate between friendly and enemy artillery.

The hyperspectral imaging technique typically employs a scanning slit spectrometer, although Fourier-transform imaging spectrometers (FTIS), and scanning filter (Fabry-Perot) imaging systems have also been used. These devices, however, record only two-dimensions of a three-dimensional data set at any one time. For example, the scanning slit spectrometer takes spectral information over a one-dimensional field of view (FOV) by imaging a scene onto a slit then passing that collimated image from the slit through a dispersive element (prism) and re-imaging various wavelength images of the slit onto a detector array. In order to develop three-dimensional information, the slit is scanned over the entire scene producing different images that must be positionally matched in post-processing. The FTIS and Fabry-Perot techniques also scan; the former scans in phase space, and the latter scans in frequency space.

Current scanning spectrometer designs have resulted in large, expensive and unwieldy devices that are unsuitable for hand-held or vehicle applications. While these spectrometers have been employed effectively in airborne and satellite applications, they have inherent design limitations. These limitations arise due to motion of the associated platform, motion or changes in the atmosphere, and/or motion of the objects in the image field that occur during scan sequences. Motion of the platform results in mismatched and misaligned sub-images, reducing the resolution and hence the effectiveness of the observations, while a moving object, such as a missile, may escape detection if the object is moving faster than the spectrometer scan rate.

SUMMARY

In one embodiment, a hyperspectral imaging system includes a focal plane array and a grating-free spectrometer that divides a field of view into multiple channels and that reimages the multiple channels as multiple spectral signatures onto the detector array.

In one embodiment, a hyperspectral imaging system includes a lenslet array that divides a field of view into multiple channels, optics that collimate electromagnetic energy of the multiple channels from the lenslet array, a grating that disperses the multiple channels into multiple spectral signatures and that reflects the electromagnetic energy back through the optics, and a focal plane array that detects the multiple spectral signatures.

In one embodiment, a hyperspectral imaging system includes imaging optics that form an image of an object, a focal plane array, a lenslet array that forms multiple images of a pupil of the imaging optics, and a prism and grating coupled to the lenslet array, to disperse the multiple images as multiple spectral signatures onto the focal plane array while blocking, by total internal reflection within the prism, unwanted spectral orders.

In one embodiment, a hyperspectral imaging system is provided. Imaging optics form an image of an object. An image slicer partitions a field of view of the imaging optics. For each partitioned part of the field of view, a focal plane array and a spectrometer divide a portioned field of view into multiple channels and reimage the multiple channels as multiple spectral signatures onto the focal plane array.

In one embodiment, a multiwavelength imager is provided. Imaging optics form an image of an object. At least one micromachined optical element (MMO) is located at or near to an image plane of the imager, providing a spectral signature for use with a focal plane array.

In one embodiment, a hyperspectral imaging system includes imaging optics that form an image of an object. A spectrometer has an array of pinholes that divide a field of view of the imaging optics into multiple channels. Dispersive optics reimage the multiple channels as multiple spectral signatures onto a focal plane array.

In one embodiment, a hyperspectral imaging system includes a lenslet array, a focal plane array, a pinhole array between the detector array and the lenslet array. The pinhole array having a different pitch than the lenslet array and aligned such that each lenslet of the lenslet array corresponds to a pinhole of the pinhole array. The lenslet array is moveable to define where an object is viewed by the imaging system. A spectrometer reimages multiple channels from the lenslet array as multiple spectral signatures onto the detector array.

In one embodiment, a hyperspectral imager includes the improvement of at least one zoom lens for selecting a variable field of view of the imager and a variable dispersion element for selecting dispersion for spectral signatures for the imager.

In one embodiment, a hyperspectral imager of the type that forms a hyperspectral data cube includes the improvement of at least one zoom collimating or relay lens that variably adjusts spectral and spatial resolution of the hyperspectral data cube.

DETAILED DESCRIPTION

A hyperspectral imaging system is disclosed herein which may achieve high instrument resolution by recording three-dimensions, two spatial dimensions (x and y) and a spectral or color dimension ($\lambda$), simultaneously. Further, the hyperspectral imager may be handheld and operate to disperse and refocus an image without using moving parts. The imaging optics may for example image faster than an f-number of at least f/5.

Figure 1:
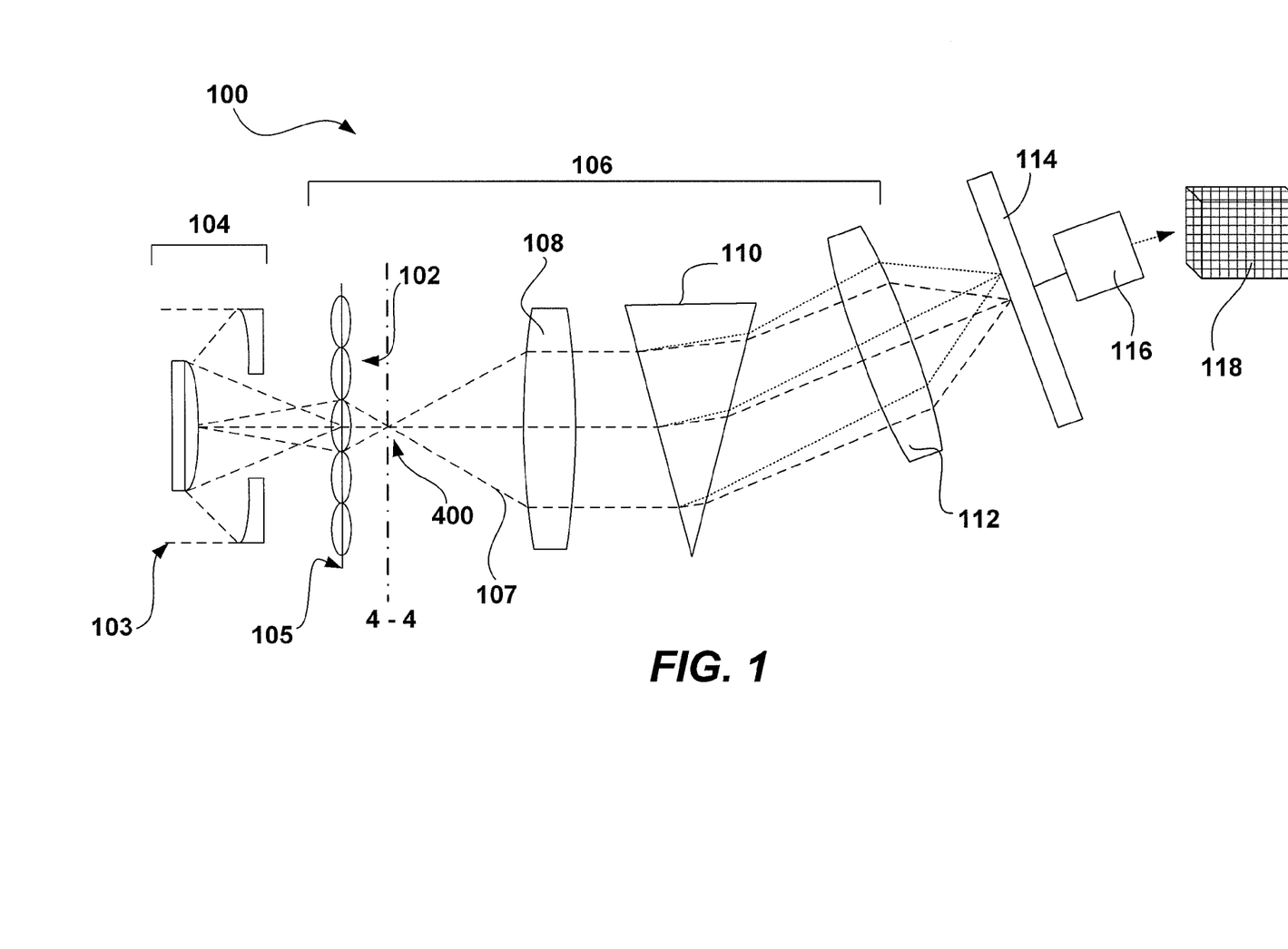
FIG. 1 illustrates a hyperspectral imaging system in accord with an embodiment.

A hyperspectral imaging system 100 is shown in FIG. 1. System 100 uses a two-dimensional lenslet array 102 at or near to an image plane 105 of imaging optics 104, to resample an image formed by imaging optics 104; lenslet array 102 is part of a spectrometer 106, discussed in more detail below. Imaging optics 104 are illustratively shown as a Cassegrain telescope but may instead comprise optical elements (e.g., as in FIG. 6) including refractive optical elements. Accordingly, imaging optics 104 may be a camera lens or other optical system that customizes imaging specifications by modifying f-number, modifying magnification, providing cold shielding, and/or providing filtering. Imaging optics 104 are illustratively shown imaging incoming electromagnetic radiation 103 onto image plane 105.

Figure 2:
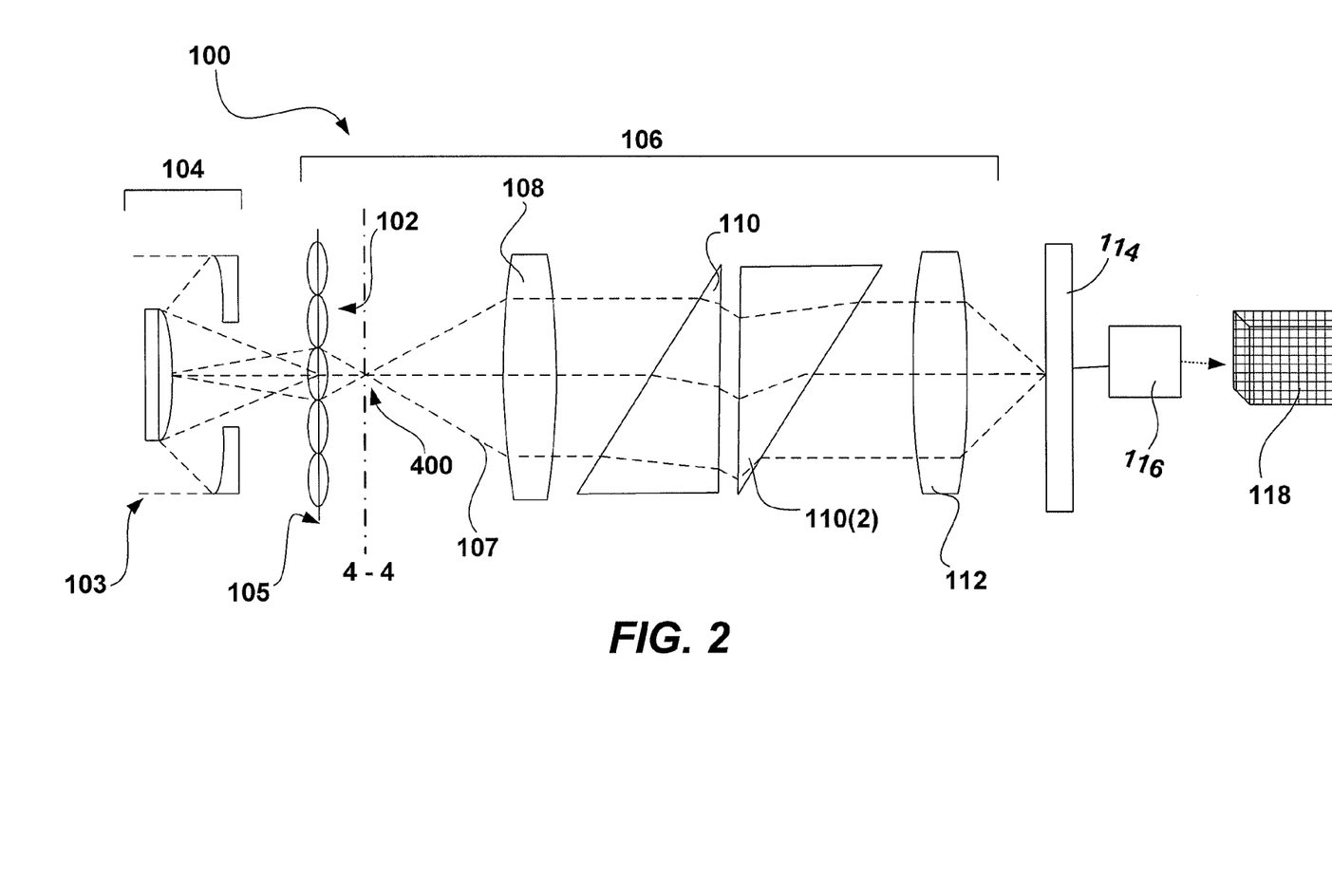
FIG. 2 illustrates a hyperspectral imaging system including crossed prisms that produce minimal dispersion of electromagnetic energy in accord with an embodiment.
Figure 3:
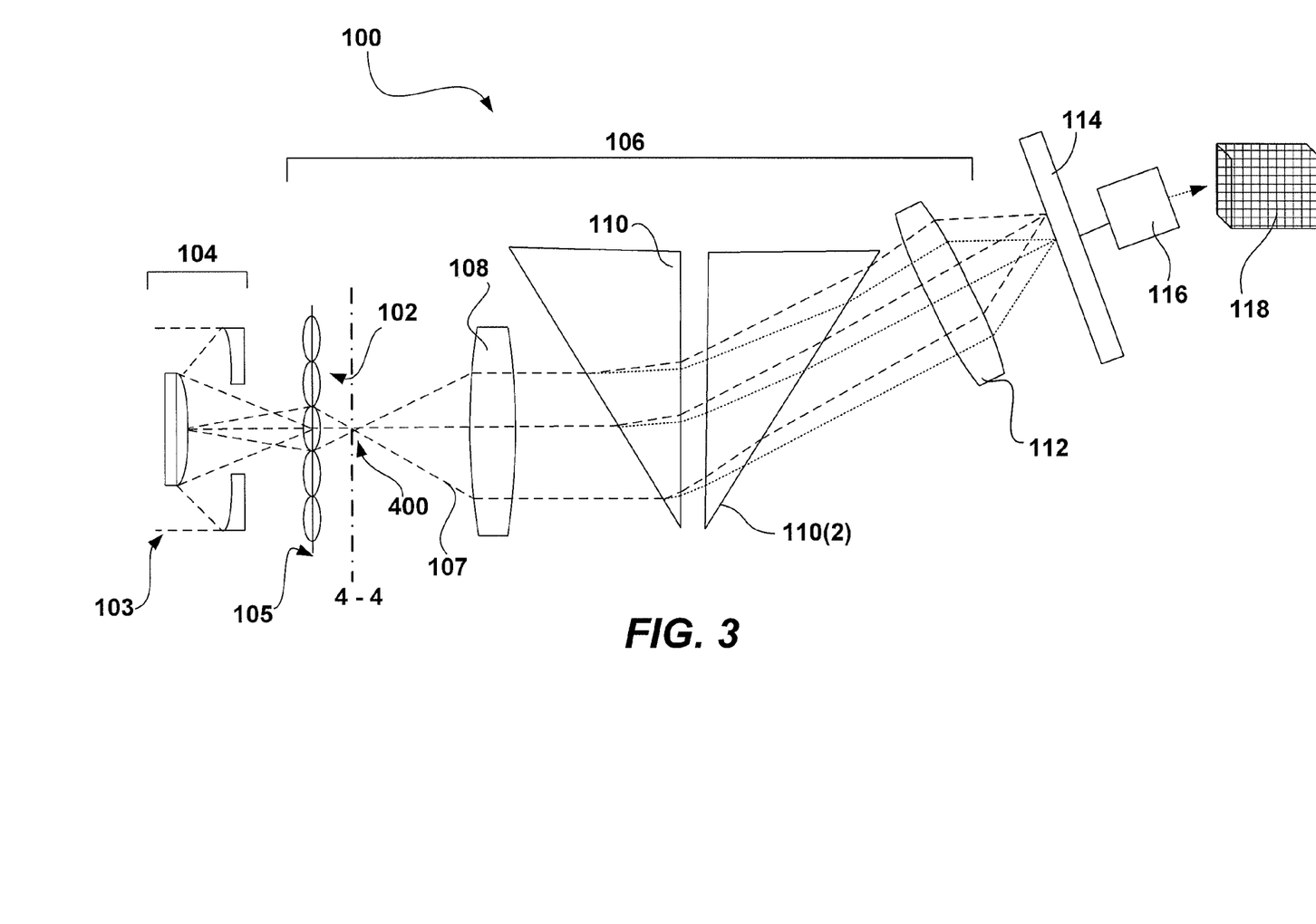
FIG. 3 illustrates a hyperspectral imaging system including crossed prisms that produce a large degree of dispersion in accord with an embodiment.
Figure 4:
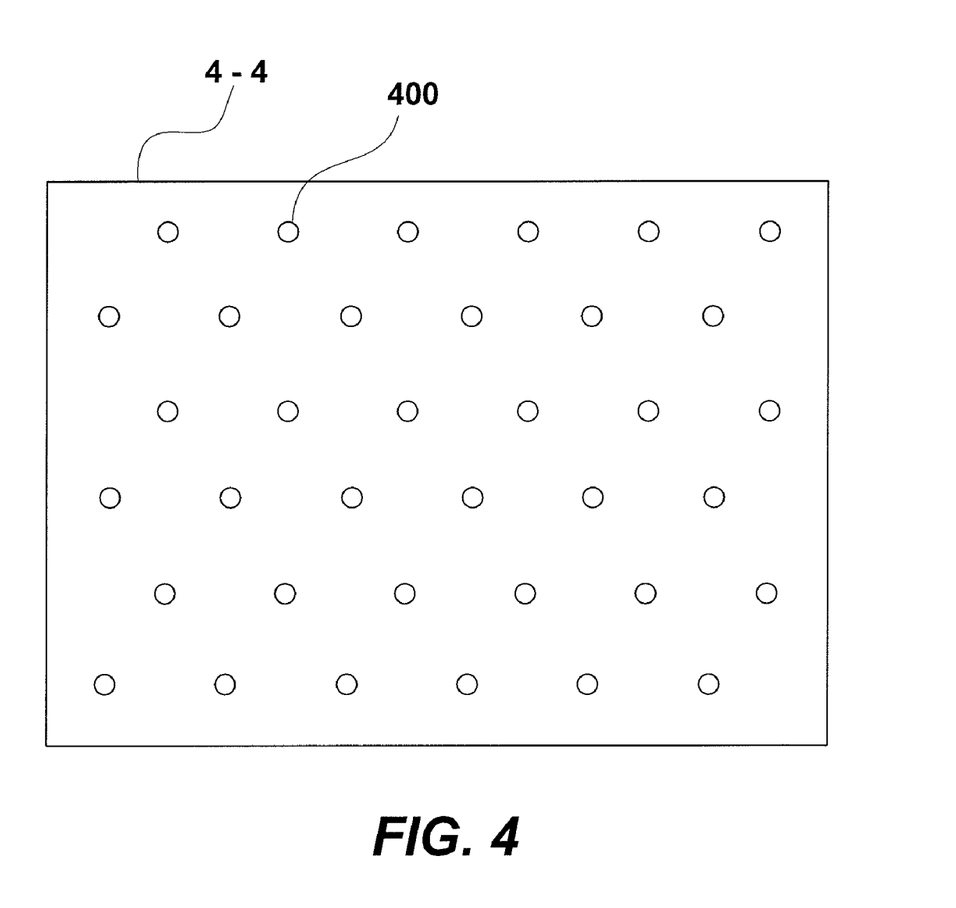
FIG. 4 illustrates an intensity pattern from a two-dimensional lenslet array.

Spectrometer 106 divides the image from imaging optics 104 into multiple channels, where each channel forms a pupil image that is focused as a spot 400 in an image plane 4-4 of lenslet array 102, as shown in FIG. 4. One exemplary channel 107 is shown in FIG. 1. In addition to lenslet array 102, spectrometer 106 includes a collimating lens 108, a dispersive element 110, and a focusing lens 112. Dispersive element 110 is, for example, a prism that separates spots 400 into multiple spectral signatures. A second dispersive element 110(2), as shown in FIGS. 2 and 3, may be used to vary the diffractive power of the first dispersive element 110; for example, dispersive elements 110 and 110(2) may form a pair of crossed prisms where one of the dispersive elements may be rotated relative to the other in order to increase or decrease dispersion. FIG. 2 illustrates a hyperspectral imaging system having crossed prisms 110, 100(2) that produces minimal dispersion of electromagnetic energy. FIG. 3 illustrates a hyperspectral imaging system having crossed prisms 110, 100(2) that produces a large dispersion of electromagnetic energy.

Those skilled in the art, upon reading and fully appreciating this disclosure, will appreciate that elements 108, 112 of FIG. 1 may comprise additional or different types of optical elements (e.g., mirrors) to form like function, without departing from the scope hereof.

As illustrated in FIG. 4, each spectral signature is associated with a single spot 400 (each spot 400 from a corresponding lenslet of array 102) and is recorded simultaneously on a two-dimensional focal plane array 114. In one example, images are spread into several hundred color bands and about 1,000 spatial locations on a 100×100 CCD detector. A CCD detector may be used for detection in the visible region, while various other detectors may be used for detection in other parts of the electromagnetic spectrum, e.g., ultraviolet (UV), near infrared (NIR), mid-wave infrared (MWIR), long-wave infrared (LWIR) and/or microwave regions. Spectrometer 106 may thus be formed of optical elements that transmit and function in a particular waveband. An uncooled microbolometer may be used as focal plane array 114 when the waveband is infrared (e.g., 8-12 microns), for example.

The images received by focal plane array 114 are captured by a computer processor 116 and both the location of an image and the spectral information for that location are processed into a three-dimensional data set denoted herein as a hyperspectral data cube 118. The data are collected in parallel and may be saved to memory and/or viewed in real time in any of the several hundred wavebands recorded. Data cubes 118 are collected at the speed of the digital detector array, typically limited by its internal digital clock. Thus data cubes may be read, for example, at a rate between 1-1000 data cubes per second with a spectral resolution in a range of about 1-50 nm, for example.

Figure 5:
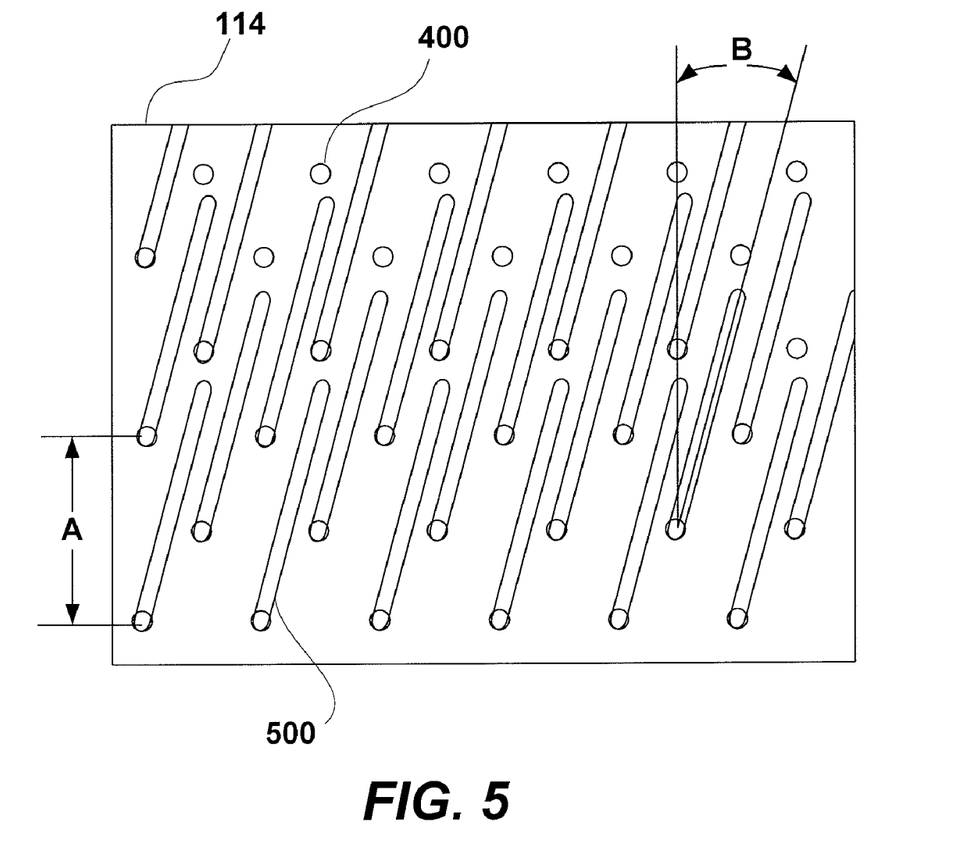
FIG. 5 illustrates an intensity pattern of spectra spread from individual channels.

As illustrated in FIG. 5, the dispersing direction (i.e., angle of dispersive element 110 relative to focal plane 114) may be rotated about the optical axis to avoid overlap of different spectra 500 on detector 114. Tilt angle B allows the spectral images to tilt between each other along the pixel separation distance A. For example, tilt angle B may range from about 10 to 20 degrees. The length of spectrum 500 is determined by the diffracting power of dispersive element(s) 110 and/or by a filter (see, e.g., FIG. 9). Accordingly, spectral resolution may be traded for spatial resolution and vice versa. For a given detector size, the number of spectral bands may be doubled, for example, by increasing the dispersion of the prism and halving the lenslet-array size (and, hence, halving the number of spatial lenslet elements). A zoom collimating or relay lens may also be used to variably adjust spectral and spatial resolution.

Referring again to FIG. 1, imaging optics 104 may be omitted from the hyperspectral imager in certain applications; in this embodiment, therefore, lenslet array 102 and a pinhole array serve to image the object as the multiple channels through the spectrometer 106. See, e.g., FIG. 9.

Figure 6:
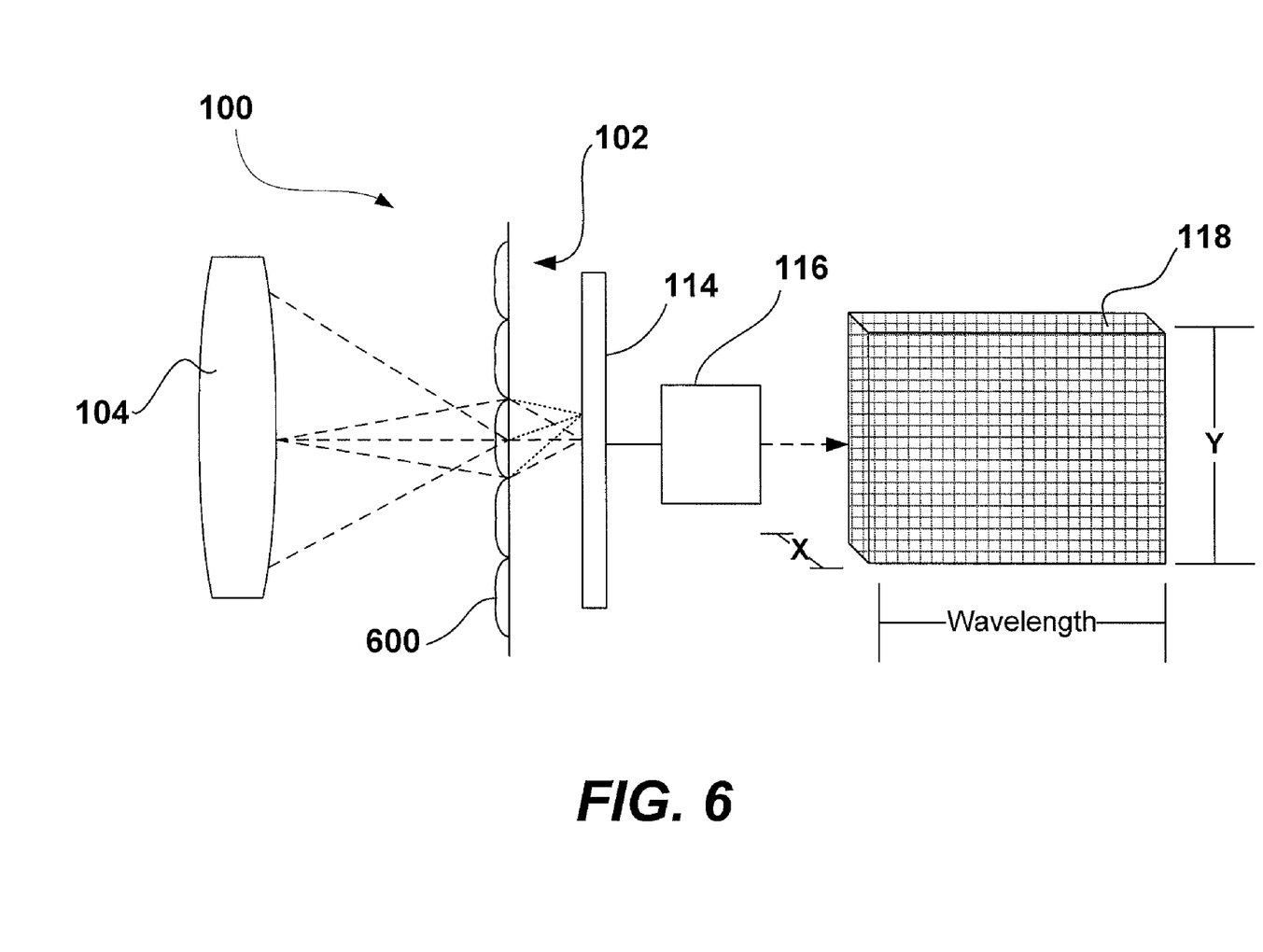
FIG. 6 illustrates a hyperspectral imaging system including a micromachined optical (MMO) assembly in accord with an embodiment.
Figure 7:
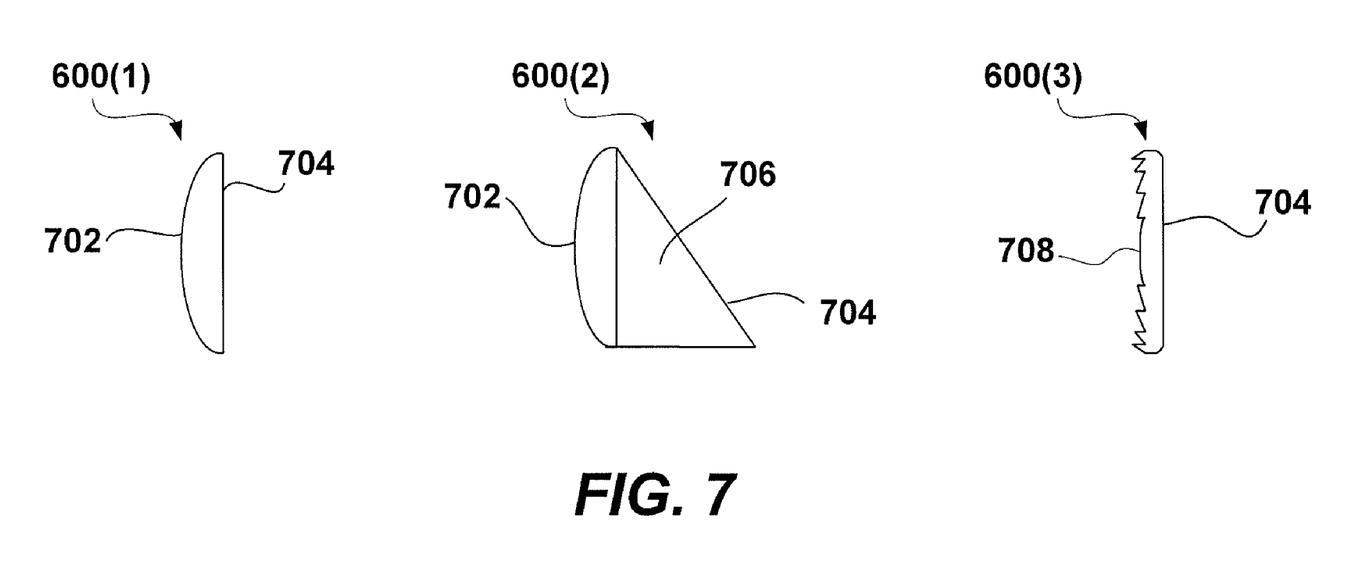
FIG. 7 illustrates exemplary MMO's of FIG. 6.

FIG. 6 shows each optic of lenslet array 102 as a micromachined optical element ("MMO") 600 that both disperses and refocuses light. Expanded cross-sectional views of several exemplary MMO's are shown in FIG. 7. For example, MMO 600(1) may include a lens 702 coupled to a transmissive grating 704 (although grating 704 is shown on the back of lens 702, it may instead be on the front of lens 702). In another example, MMO 600(2) includes a lens 702 coupled to a prism 706 and a transmissive grating 704. Prism 706 may be configured to block a selected order by total internal reflection within the prism, but yet allow other spectral orders to be transmitted through lens 702 and diffracted by transmissive grating 704. See, e.g., FIG. 8. In yet another example, a Fresnel lens 708 is coupled with a transmissive grating 704 as part of MMO 600(3).

The use of MMO's may reduce the overall size and complexity of the hyperspectral imaging system, as well as increase the durability of the instrument using the hyperspectral imaging system, because there are no moving parts. Since the MMO's are micromachined they are ideally suited for manufacturing in silicon for use in infrared imagers. Alternatively, using a low cost replicating technique, the MMO's may be molded into epoxy on glass, for use in the visible waveband. Gratings may be applied to the MMO's during the molding process or by chemical etching, photolithography and the like.

Figure 8:
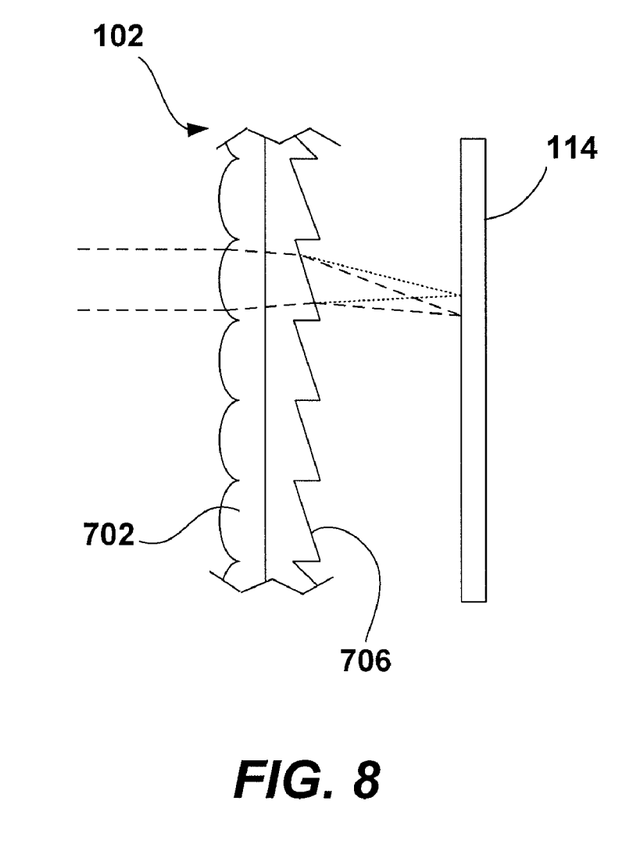
FIG. 8 illustrates a cross-section of one MMO assembly in accord with an embodiment.

FIG. 8 illustrates a cross-section of lenslet array 102 having lenses 702 for receiving and refocusing radiation. Each lens 702 is coupled with a prism 706 (and/or grating) that disperses radiation into its constituent wavelengths (spectral signature) onto focal plane array 114.

Figure 9:
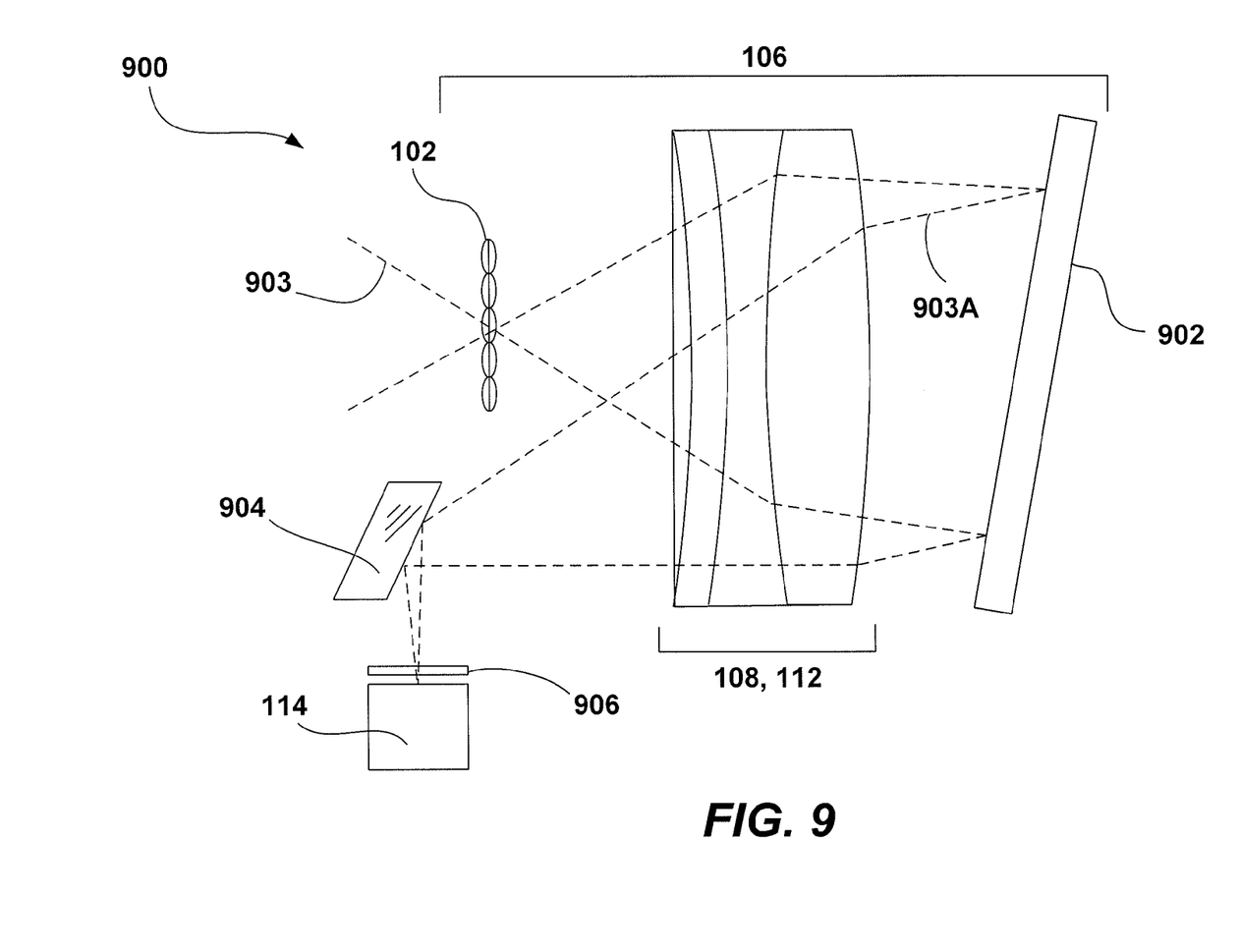
FIG. 9 illustrates a hyperspectral imaging system including a reflective grating in accord with an embodiment.

FIG. 9 illustrates a hyperspectral imaging system 900 including a reflective grating 902. Electromagnetic energy 903 may be received directly by lenslet array 102 or transmitted through imaging optics 104 (not shown). Lenslet array 102 images and divides a field of view into multiple channels that are transmitted through spectrometer 106, which illustratively includes both collimator 108 and focusing lens 112. Spectrometer 106 may, for example, be an aspheric optical component manufactured of transmissive germanium, to operate in the infrared. Electromagnetic energy transmitted through spectrometer 106 is reflected and diffracted by reflective grating 902, which is for example used in a Littrow configuration. The reflected electromagnetic energy 903A is transmitted back through spectrometer 106 and reflected by a fold mirror 904 through a filter 906 onto a focal plane array 114. Filter 906 may, for example, limit spectral length A (FIG. 5) and prevent spectral overlap on detector 114.

Figure 10:
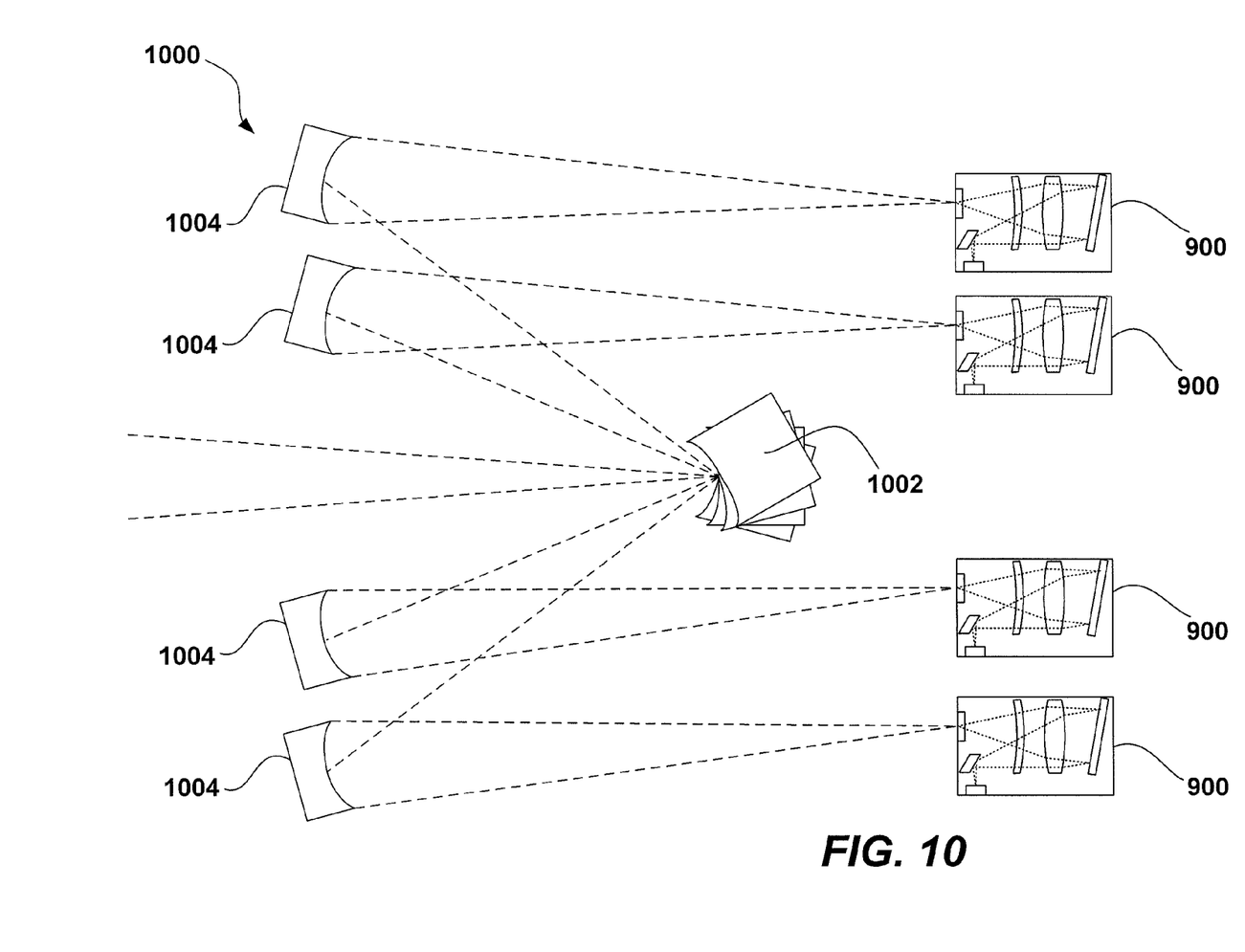
FIG. 10 illustrates a hyperspectral imaging system including an image slicer in accord with an embodiment.

FIG. 10 illustrates a hyperspectral imaging system 1000 including an image slicer 1002. Image slicer 1002 divides an image received from imaging optics 104. In the embodiment of FIG. 10, each slice of electromagnetic energy intersects a reflective element 1004 that transmits its associated energy to a designated spectrometer and detector combination. For example, the spectrometer/detector combination may be that of hyperspectral imaging system 900, although other hyperspectral imaging systems may be employed. Use of lenslet array 102 in combination with image slicer 1002 produces a two-dimensional field of view divided into multiple channels that can be dispersed by a grating without order overlap.

Figure 11:
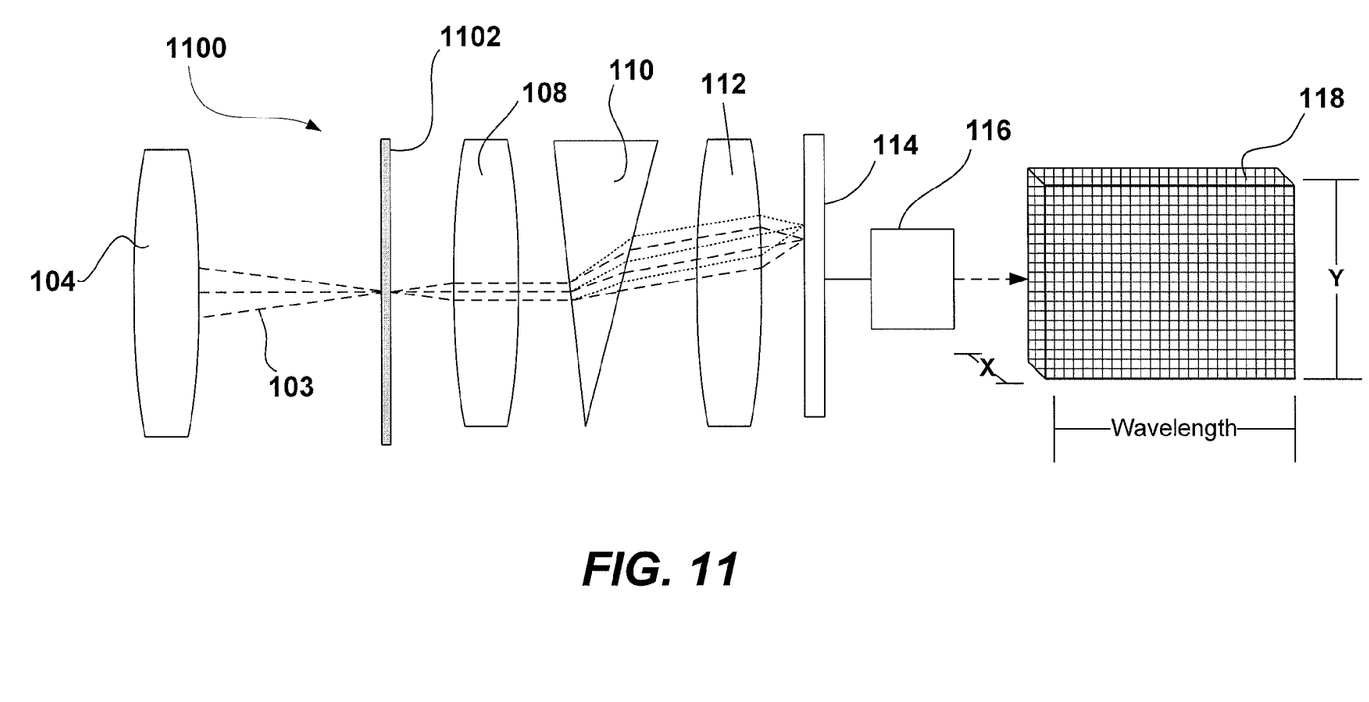
FIG. 11 illustrates a hyperspectral imaging system including a pinhole array in accord with an embodiment.

FIG. 11 illustrates a hyperspectral imaging system 1100 including a pinhole array 1102. Pinhole array 1102 may be used in place of, or in addition to, lenslet array 102 to divide the image into multiple channels through pinholes. Pinhole array 1102 may be positioned at or near to the image plane of imaging optics 104. In one embodiment, pinhole array 1102 is moveable so that pinhole array 1102 is positioned to capture selective field positions of the object sampled by system 1102. If pinhole array 1102 is positioned near to, but not at the image plane, then defocus energy transmits through pinholes of array 1102 such that integration of field positions occurs through the several channels of system 1100. Pinhole array 1102 may be reflective to act as a narcissus mirror. A narcissus mirror reduces background radiation in the case of infrared imaging. Similarly, pinhole array 1102 may be absorbing and cooled to reduce background radiation, which is particularly beneficial when the waveband sampled by the spectrometer is in the infrared. A collimating lens 108, dispersive element 110, and focusing lens 112 may be used in conjunction with pinhole array 1102 to disperse and refocus multiple channels into multiple spectral signatures on focal plane array 114.

Figure 12:
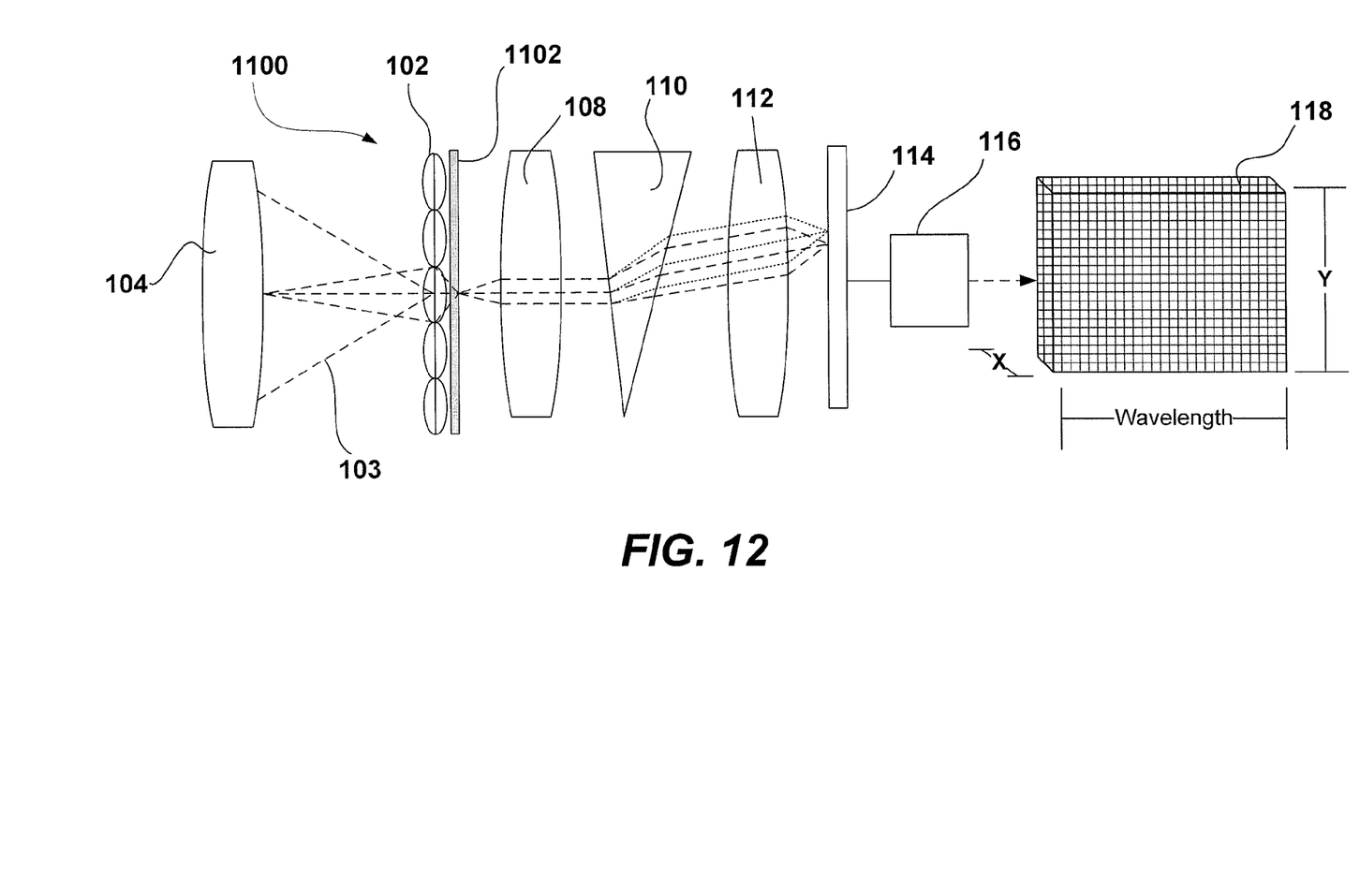
FIG. 12 illustrates a hyperspectral imaging system including a lenslet array and a pinhole array in accord with an embodiment

FIG. 12 illustrates a hyperspectral imaging system including lenslet array 102 and pinhole array 1102. Lenslet array 102 may be located between the object and pinhole array 1102 with each lens 600 of lenslet array 102 aligned with a corresponding pinhole of pinhole array 1102. The pitch of lenslet array 102 and pinhole array 1102 are the same when imaging optics 104 is present, i.e., each pinhole is located at the optical axis of a lens 600. If imaging optics 104 is not present within system 1100, electromagnetic energy 103 may be directly sampled by lenslet array 102 and pinhole array 1102 by differing the pitch between lenslet array 102 and pinhole array 1102. The pitch between lenslet array 102 and pinhole array 1102 are made to differ by offsetting the optical axis of one array relative to the other.

Multiple hyperspectral imagers may be used to cover a large field of view. For example, the exterior of a surveillance plane may be covered with multiple hyperspectral imagers. Data from the multiple imagers may be compiled into one comprehensive data set for viewing and analysis.

Alternatively, a large-scale hyperspectral imager may be fabricated according to the present instrumentalities. For example, a large-scale imager may be used in aerial or satellite applications. The costs of fabricating and transporting an imager as herein disclosed may be less than similar costs associated with a traditional hyperspectral imaging system due to the decreased number of optical components and weight thereof.

A large degree of flexibility is available where, for example, imaging optics, lenslet arrays, pinhole arrays, detectors, filters, and the like may be interchanged as necessary for a desired application of the hyperspectral imaging system. In one embodiment, illustrated in FIG. 13, a micromachined optical (MMO) assembly wheel 1300 for positioning multiple MMO's formed into lenslet arrays 102 within the imaging system is provided. Selection of any one lenslet array 102 provides differing spectral signatures from any other lenslet array of MMO wheel 1300. For example, lenslet arrays 102(1) and 102(2) provide hexagonally packed MMO's 600(4) and 600(5), respectively. However, MMO's 600(5) may include different optical components, i.e., filters, gratings and/or prisms, than MMO's 600(4). Lenslet arrays 102(3) and 102(4) provide close packed hexagonal arrangements of MMO's 600(6) and 600(7), respectively, and the optical components of MMO's 600(6) and 600(7) may differ. MMO's 600(4) and 600(5) are larger than MMO's 600(6) and 600(7). Large MMO's may provide for decreased spatial resolution, but increased spectral resolution.

Figure 13:
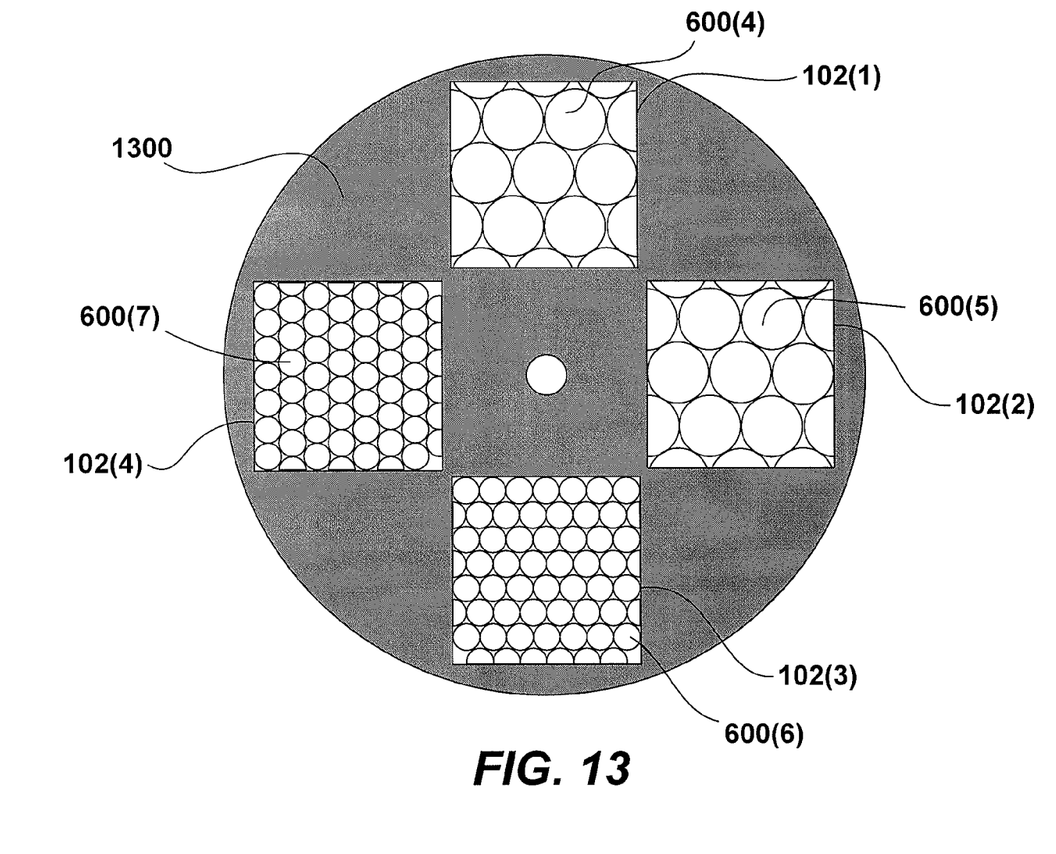
FIG. 13 illustrates an assembly wheel incorporating various MMOs in accord with an embodiment.

It is also possible that lenses 600, that are not coupled with gratings 704 or prisms 706, may be utilized in a MMO wheel 1300. It may then be desirable to vary the amount of dispersion to accommodate various lens sizes. For example, dispersive element(s) 110 may be rotated to increase dispersion when large lenses 600 are used and decrease dispersion when small lenses 600 are used to sample an image. Zoom lenses may also be used beneficially with differing MMOs within the hyperspectral imaging system.

Object identification, which is more than mere recognition, may be performed by software to distinguish objects with specific spatial and spectral signatures. For example, materials from which objects in the image are made may be spectrally distinguished, e.g., in the visible range, paint on an enemy tank may be distinguished from paint on a friendly tank, while in the infrared region, a water treatment plant may be distinguished from a chemical weapons factory. The software may be trained to color code or otherwise highlight elements of the image with particular spatial and/or spectral signatures.

Certain changes may be made in the systems and methods described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A hyperspectral imaging system, comprising:
a focal plane array;
a grating-free spectrometer, having one or both of a lenslet array and an aperture array, for first dividing a field of view into multiple channels and for then reimaging each of the multiple channels as a spectral signature onto the focal plane array;
first optics, to collimate electromagnetic energy of the multiple channels;
a prism, to disperse the electromagnetic energy of the multiple channels into the spectral signatures;
second optics to image the spectral signatures onto the focal plane array; and
a processor connected with the focal plane array for forming a hyperspectral data cube from the spectral signatures, wherein objects may be identified from the hyperspectral data cube.

2. The system of claim 1, further comprising imaging optics for forming an image of an object within the field of view.

3. The system of claim 2, the apertures or lenslets being positioned adjacent to an image formed by the imaging optics.

4. The system of claim 2, the apertures or lenslets being positioned adjacent to the image formed by the imaging optics.

5. The system claim 2, wherein the imaging optics form a defocused image sampled by the lenslet array or aperture array.

6. The system of claim 1, the apertures being formed by a narcissus mirror or being formed by an optically absorbing material that is cooled, to reduce background radiation onto the focal plane array.

7. The system of claim 1, the grating-free spectrometer comprising:
a first prism for dispersing the electromagnetic energy of each of the multiple channels into the multiple spectral signatures.

8. The imager of claim 7, further comprising a second prism for redirecting spectra of the first prism along the optical axis;
the first and second prisms forming a zero deviation prism.

9. The imager of claim 1, wherein the focal plane array corresponds to a field of view formed by the imaging optics and partitioned by an image slicer; and wherein the spectrometer divides the partitioned field of view into multiple channels and reimages the multiple channels as multiple spectral signatures onto the focal plane array.

10. The imager of claim 1, further comprising at least one zoom collimating or relay lens that variably adjusts spectral and spatial resolution of the hyperspectral data cube.

11. The system of claim 1, the lenslet array comprising one or more prisms, zero deviation prisms or micromachined optical elements.

12. The system of claim 1, wherein the lenslets comprise cylinder lenses.

13. The system of claim 1, wherein the apertures comprise slits or pinholes.

14. The system of claim 1, further comprising optics, to collimate electromagnetic energy of the multiple channels; a prism, to disperse the electromagnetic energy of the multiple channels into multiple spectral signatures; and optics to image the spectral signatures onto the focal plane array.

15. The system of claim 1, wherein the processor identifies objects based at least in part upon time variation of the hyperspectral data cube.

16. A hyperspectral imaging system, comprising:
imaging optics for forming an image of an object;
an image slicer for partitioning a field of view of the imaging optics; and, for each partitioned part of the field of view:
a focal plane array;
a spectrometer for first dividing its field of view into multiple channels and for then reimaging each of the multiple channels as a spectral signature onto the focal plane array, the spectrometer including one or both of an array of apertures and an array of lenslets and further comprising:
first optics, to collimate electromagnetic energy of the multiple channels;
a prism, to disperse the electromagnetic energy of the multiple channels into the spectral signatures; and
second optics to image the spectral signatures onto the focal plane array; and
a processor connected with the focal plane array for forming a hyperspectral data cube from the spectral signatures, wherein objects may be identified from the hyperspectral data cube.

17. The system of claim 16, the apertures comprising pinholes or slits that sample the image and divide the field of view to form the multiple channels.

18. The system of claim 16, the spectrometer comprising both the array of apertures and the lenslet array, wherein each lenslet of the lenslet array is aligned with a corresponding aperture of the aperture array.

19. The system of claim 16, the spectrometer comprising: (a) the lenslet array, to form the multiple channels; (b) optics, to collimate electromagnetic energy of the multiple channels from the lenslet array; and (c) a reflection grating, to disperse the multiple spectral signatures back through optics and to the focal plane array.

20. The system of claim 16, the spectrometer comprising: (a) the lenslet array oriented such that a two dimensional segment of the partitioned field of view images onto a two dimensional portion of the lenslet array; (b) optics, to collimate electromagnetic energy of the multiple channels from the lenslet array; and (c) a reflection grating oriented such that at least one spectrum images back through the optics and onto the focal plane array along a direction of dispersion.

21. A multiwavelength imager, comprising:
imaging optics for forming an image of an object;
a focal plane array;
at least one micromachined optical element (MMO) located at or near to an image plane of the imaging optics, for providing a spectral signature for use with the focal plane array, the at least one MMO including (a) a lenslet array and (b) Fresnel optics, to image an entrance pupil of the imaging optics and to divide it into wavelengths;

an assembly wheel for positioning multiple MMOs within the imager wherein selection of any one MMO provides differing spectral signatures from any other MMO of the assembly wheel; and a processor connected with the focal plane array for forming a hyperspectral data cube from the spectral signatures, wherein objects may be identified from the hyperspectral data cube.

22. The imager of claim 21, wherein the lenslet array incorporates the Fresnel optics.

23. The imager of claim 21, wherein the MMO includes both the Fresnel optics and a grating, to image the entrance pupil of the imaging optics and divide it into wavelengths.

24. A hyperspectral imaging system, comprising:
   imaging optics for forming an image of an object;
   a focal plane array;
   a spectrometer having an array of apertures that first divide a field of view of the imaging optics into multiple channels and dispersive optics for then reimaging each of the multiple channels as a spectral signature onto the focal plane array, the spectrometer further comprising:
      first optics, to collimate electromagnetic energy of the multiple channels;
      a prism, to disperse the electromagnetic energy of the multiple channels into the spectral signatures; and
      second optics to image the spectral signatures onto the focal plane array; and
   a processor connected with the focal plane array for forming a hyperspectral data cube from the spectral signatures, wherein objects may be identified from the hyperspectral data cube.

25. A hyperspectral imaging system, comprising:
   a lenslet array;
   a focal plane array;
   an aperture array between the detector array and the lenslet array, the aperture array having a different pitch than the lenslet array, the lenslet array moveable to define where an object is viewed by the imaging system, wherein each lenslet of the lenslet array is aligned with a corresponding aperture of the aperture array;
   a grating-free spectrometer for reimaging multiple channels from the lenslet array as multiple spectral signatures onto the detector array;
   first optics, to collimate electromagnetic energy of the multiple channels;
   a prism, to disperse the electromagnetic energy of the multiple channels into the spectral signatures;
   second optics to image the spectral signatures onto the focal plane array; and
   a processor connected with the focal plane array for forming a hyperspectral data cube from the spectral signatures, wherein objects may be identified from the hyperspectral data cube.

* * * * *